(12) United States Patent
Grenfell

(10) Patent No.: US 8,928,661 B2
(45) Date of Patent: Jan. 6, 2015

(54) REPRESENTING A FIELD OVER A TRIANGULAR MESH

(75) Inventor: Desmond Trevor Thomas Grenfell, Rossendale (GB)

(73) Assignee: Adobe Systems Incorporated, San Jose, CA (US)

( * ) Notice: Subject to any disclaimer, the term of this patent is extended or adjusted under 35 U.S.C. 154(b) by 800 days.

(21) Appl. No.: 13/033,468

(22) Filed: Feb. 23, 2011

(65) Prior Publication Data
US 2014/0139525 A1 May 22, 2014

(51) Int. Cl.
*G06T 15/30* (2011.01)

(52) U.S. Cl.
USPC .......................................................... 345/423

(58) Field of Classification Search
USPC .......................................................... 345/423
See application file for complete search history.

(56) References Cited

U.S. PATENT DOCUMENTS

| | | | |
|---|---|---|---|
| 5,602,979 A | 2/1997 | Loop | |
| 5,945,996 A | 8/1999 | Migdal et al. | |
| 6,037,949 A | 3/2000 | DeRose et al. | |
| 6,489,960 B2 | 12/2002 | DeRose et al. | |
| 7,230,624 B2 | 6/2007 | Lengyel | |
| 7,233,337 B2 | 6/2007 | Lengyel | |
| 7,277,094 B2 | 10/2007 | Borac | |
| 7,423,641 B2 | 9/2008 | Borac | |
| 7,626,591 B2 | 12/2009 | Crawfis et al. | |
| 2001/0002131 A1 | 5/2001 | DeRose et al. | |
| 2002/0042697 A1 | 4/2002 | Yamada et al. | |
| 2002/0190988 A1* | 12/2002 | Maillot et al. | 345/428 |
| 2004/0001059 A1 | 1/2004 | Pfister et al. | |
| 2004/0075659 A1 | 4/2004 | Taubin | |
| 2004/0249615 A1 | 12/2004 | Grzeszczuk et al. | |
| 2004/0257375 A1 | 12/2004 | Cowperthwaite | |
| 2005/0243088 A1 | 11/2005 | Lengyel | |
| 2005/0248572 A1 | 11/2005 | Lengyel | |
| 2007/0171234 A1 | 7/2007 | Crawfis et al. | |
| 2009/0309897 A1* | 12/2009 | Morita et al. | 345/629 |
| 2010/0085352 A1 | 4/2010 | Zhou et al. | |
| 2010/0114813 A1* | 5/2010 | Zalay et al. | 706/58 |
| 2010/0156901 A1 | 6/2010 | Park et al. | |
| 2010/0156920 A1 | 6/2010 | Shin et al. | |
| 2010/0211370 A1 | 8/2010 | Maliassov | |
| 2010/0322518 A1* | 12/2010 | Prasad et al. | 382/173 |
| 2011/0310102 A1* | 12/2011 | Chang | 345/423 |

OTHER PUBLICATIONS

Shusterman et al. (image compression via improved quadtree decomposition algorithm, IEEE, 1994).*
Pajarola (Overview of Quadtree-based Terrain Triangulation and Visualization, 2002).*

(Continued)

*Primary Examiner* — Maurice L McDowell, Jr.
*Assistant Examiner* — Kyle Zhai
(74) *Attorney, Agent, or Firm* — Kilpatrick Townsend & Stockton LLP

(57) ABSTRACT

Methods and apparatus for representing a field over a triangular mesh are disclosed. A two-dimensional (2D) triangular map may be created for each triangle of a three-dimensional (3D) triangular mesh. The triangular map may be recursively subdivided to create a plurality of sub-triangles. The sub-triangles may be sampled, and an field may be measured or calculated at each level of the recursion. The map of field values may use various compression techniques and may also employ a delayed reading technique. The map may be multi-resolution, hierarchical, and partitioned.

23 Claims, 10 Drawing Sheets

(56) References Cited

OTHER PUBLICATIONS

Sarkis, et al., "Fast Depth Map Compression and Meshing with Compressed Tritree," H. Zha, R.-i. Taniguchi, and S. Maybank (Eds.): ACCV 2009, Part II, LNCS 5995, pp. 44-55, 2010, c Springer-Verlag Berlin Heidelberg 2010.

Yuksel, et al, "Mesh Colors," Department of Computer Science, Texas A&M University, Technical Report tamu-cs-tr-2008-4-1, 8 pages.

Burley, et al., "Ptex: Per-Face Texture Mapping for Production Rendering," www.disneyanimation.com/library/ptex/, 2008, 2 pages.

Nicolas Ray, Jean-Christophe Ulysse, Xavier Cavin and Bruno Levy, "Generation of Radiosity Texture Atlas for Realistic Real-Time Rendering," Eurographics 2003, 7 pages.

Silva, et al., "Image Compression via TRITREE Decomposition," Proceedings of the XIII Brazilian Symposium on Computer Graphics and Image Processing (SIBGRAPI'00), 0-7695-0878-2/00 $10.00 © 2000 IEEE, 1 page.

\* cited by examiner

REPRESENTING A FIELD OVER A TRIANGULAR MESH

BACKGROUND

1. Technical Field

This disclosure relates generally to graphics rendering, and more specifically, representing a field over a triangular mesh.

2. Description of the Related Art 3D rendering schemes allow for the rendering of arbitrary views of a 3D model. 3D models are often represented as a mesh of triangular faces. A common requirement is for some field to be mapped onto the surface of such models. For example, a pre-computed texture (e.g., lighting or shadows) map can be mapped onto the surface of the rendered model to considerably improve the realism of the model. As another example, a separate height field can be mapped to add geometric detail at a lower cost than adding more triangles. The improvements in realism and detail do not come without cost. The pre-computed textures (data fields) may require considerable time and computing resources to create and may additionally require composited images captured from a real-world model. In each case, the data fields must be represented over the entire surface of the 3D model, which may result in very large and complex datasets, thus reducing sampling accuracy and storage efficiency.

One method of mapping an arbitrary field onto a simplicial complex is by using texture mapping. Texture mapping creates a separate bijection that associates every point of the surface of the triangular mesh with a point within some 2D domain. The textures used in the mapping are typically modeled as a two-dimensional (2D) texture map representing a "sheet" of elastic material, i.e., one that can be attached to, or wrapped around, the surface mesh to produce the desired result. This mapping generally needs to be conformal and isometric (i.e., angle and length preserving). Creating such maps for general triangular meshes, however, can be problematic and is not always the most suitable or efficient mechanism for meshed surfaces with significant intrinsic curvature. For example, for irregular topologies and curvatures, simple approaches, such as the one described above, may lead to uneven mappings in which equally-sized regions of the surface are assigned to very differently sized regions of the data field. This variable field resolution may result in lower re-sampling accuracy and storage efficiency therefore yielding a slower, lower quality renderer.

SUMMARY

This disclosure describes techniques and structures that facilitate representing a field over a mesh of triangles or a mesh of polygons, which can be represented as a mesh of triangles. In one embodiment, a separate 2D triangular map may be created for each triangle in a 3D triangular mesh. In creating the separate 2D triangular maps, an adaptive recursion may be used. In some embodiments, the triangular maps may be hierarchical and multi-resolution. As a result, the triangular maps may be partitioned and used as part of a dynamic loading scheme.

In one embodiment, four sub-triangles may be generated within each triangle. Each sub-triangle may be recursively subdivided down to a prescribed depth from the top level triangle. The top level triangle and its network of sub-triangles may form a graph whose nodes are subdivided triangles and whose leaf nodes are non-subdivided triangles. The value of some field, such as light-visibility or color, may be sampled at the center of each leaf node and taken as a representative value of the field within that node. The average field value of the non-leaf nodes may be recursively calculated using the sampled values at the leaf-nodes until reaching a top-level triangle of the 2D triangular map. A variance may be calculated for each node by considering the average field values over its child nodes. Where this variance falls below some threshold, that node may be pruned and its field approximated by a single average value. Unpruned nodes may be serialized or stored by level of recursive depth. In some embodiments, serialization may also occur by triangle. In some embodiments, fewer than all of the sampled, unpruned leaf nodes may be stored (e.g., about 75% may be stored). The stored field values and an estimation of the unpruned, unstored nodes (the other 25%) may be used to specify the field over a domain of general topology as part of a render pipeline. In one embodiment, specifying the field may include computing re-sampled values of the field based on the stored and estimated values and supplying the re-sampled values to a pixel-pipeline of a rendering environment.

In some embodiments, a request may be received to specify the field to a next lower level resolution than the depth level. The actual values of the unpruned, unstored nodes may be read and the recursive process above (i.e., generating, sampling, calculating, pruning, storing, and specifying) may be repeated for the next lower level resolution.

In some embodiments, the average field values may be recalculated at a particular resolution level. The recalculation may be performed at a plurality of vertices of the sub-triangles at the resolution level. Recalculating may include re-averaging the values of the field over each sub-triangle adjacent to each vertex. The recalculated average field values may be stored in texture memory.

Figure 1:
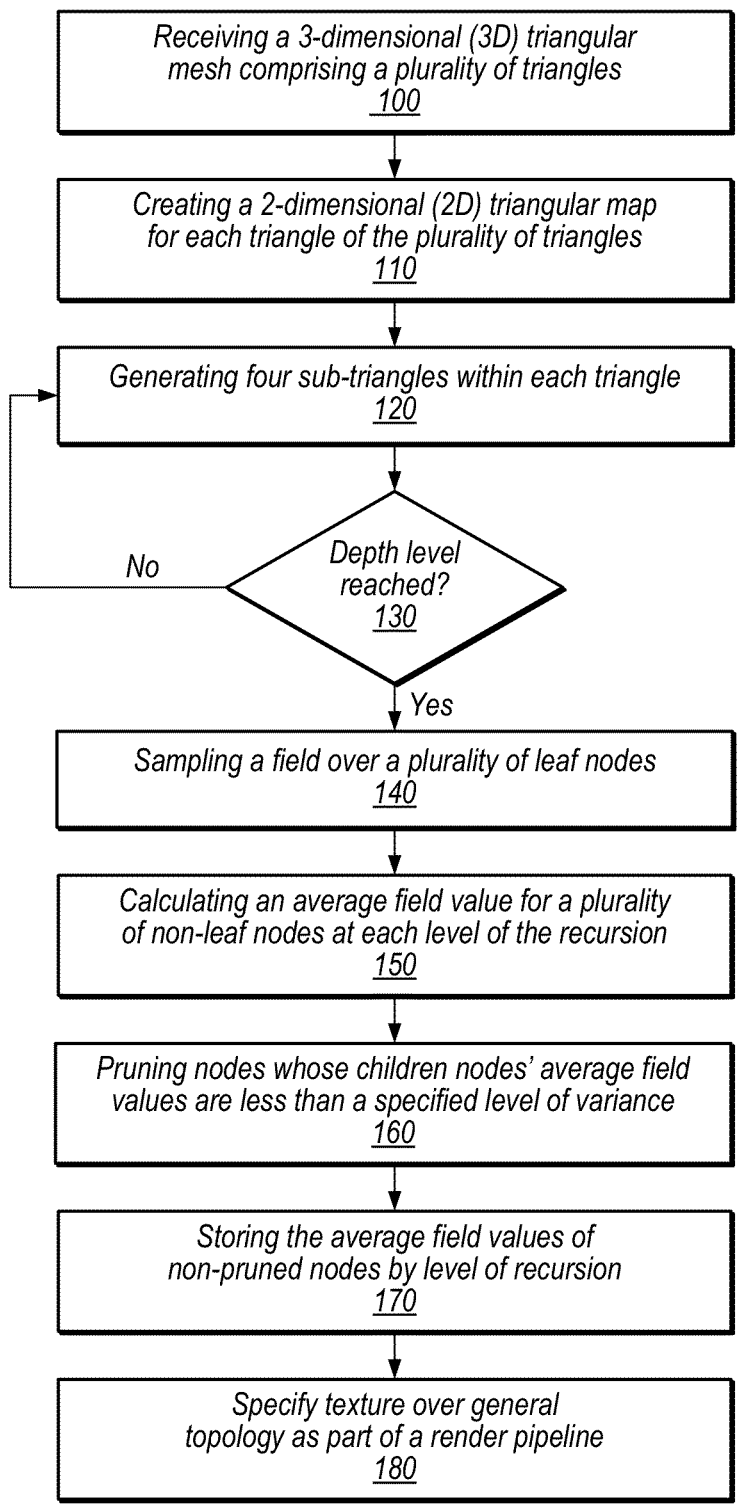
FIG. 1 is a flowchart of a method of representing a field over a triangular mesh, according to some embodiments.

While the disclosure is described herein by way of example for several embodiments and illustrative drawings, those skilled in the art will recognize that the disclosure is not limited to the embodiments or drawings described. It should be understood, that the drawings and detailed description thereto are not intended to limit the disclosure to the particular form disclosed, but on the contrary, the intention is to cover all modifications, equivalents and alternatives falling within the spirit and scope of the present disclosure. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Detailed Description Of Embodiments

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

"First," "Second," etc. As used herein, these terms are used as labels for nouns that they precede, and do not imply any type of ordering (e.g., spatial, temporal, logical, etc.). For example, in a processor having eight processing elements or cores, the terms "first" and "second" processing elements can be used to refer to any two of the eight processing elements. In other words, the "first" and "second" processing elements are not limited to logical processing elements 0 and 1.

Digital image editing applications, executed on a computing device, may be used to manipulate, enhance, transform, create and render images, such as digital photographs and computer art. Digital image editing applications may be used to render and modify three-dimensional (3D) objects or images, according to various embodiments described herein, and use an application programming interface (API) such as OpenGL or Direct3D. As used herein, the terms 3D surface mesh, 3D graphics models, and 3D image may be used interchangeably, where all three may refer to a set of 3D polygons representing a 3D object, which may or may not be rendered by a 3D rendering engine.

Various embodiments of methods and apparatus for representing a field over a triangular mesh are described. Some embodiments may include a means for representing a field over a polygonal, such as triangular, mesh. For example, a field representing module may receive a triangular mesh as input, specify an arbitrary field within the mesh, and render graphics with the field represented over the mesh. The field representing module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving a triangular mesh as input, specifying an arbitrary field within the mesh, and rendering graphics with the field represented over the mesh, as described herein. Other embodiments of the field representing module may be at least partially implemented by hardware circuitry and/or firmware stored, for example, in a non-volatile memory.

Turning now to FIG. 1, one embodiment of a method of representing a field over a polygonal mesh is shown. For simplicity of explanation, the following figures are described in reference to triangular meshes, however, the disclosure and embodiments are not limited to triangular meshes. Other polygonal meshes are envisioned that may be recast in terms of an approximately equivalent mesh of triangles, such as quadrangular meshes, pentagonal meshes, etc. While the blocks are shown in a particular order for ease of understanding, other orders may be used. In some embodiments, the method of FIG. 1 may include additional (or fewer) blocks than shown. Additionally, the method of claim 1 may, in some embodiments, additionally utilize one or more blocks of the methods of FIG. 2 and/or 3. Blocks 100-180 may be performed automatically or may receive additional user input.

As indicated at 100, a three-dimensional (3D) triangular mesh may be received. The 3D triangular mesh may include a plurality of triangles. In one embodiment, the received 3D triangular mesh may represent a 3D model in a computer system. The 3D triangular mesh may be well connected and well oriented.

At 110, a two-dimensional (2D) triangular map may be created for each triangle of the triangular mesh. Creating separate 2D triangular maps for each triangle of the triangular mesh may include blocks 120-170, described below. Accordingly, creating the 2D triangular maps may be adaptively recursive, i.e., adaptive to multiple levels of recursion. In addition, the triangular maps may be hierarchical and multi-resolution in nature. These features of the triangular maps may allow for partitioning methods that allow the maps to be used as part of a dynamic loading scheme described below.

Figure 6:
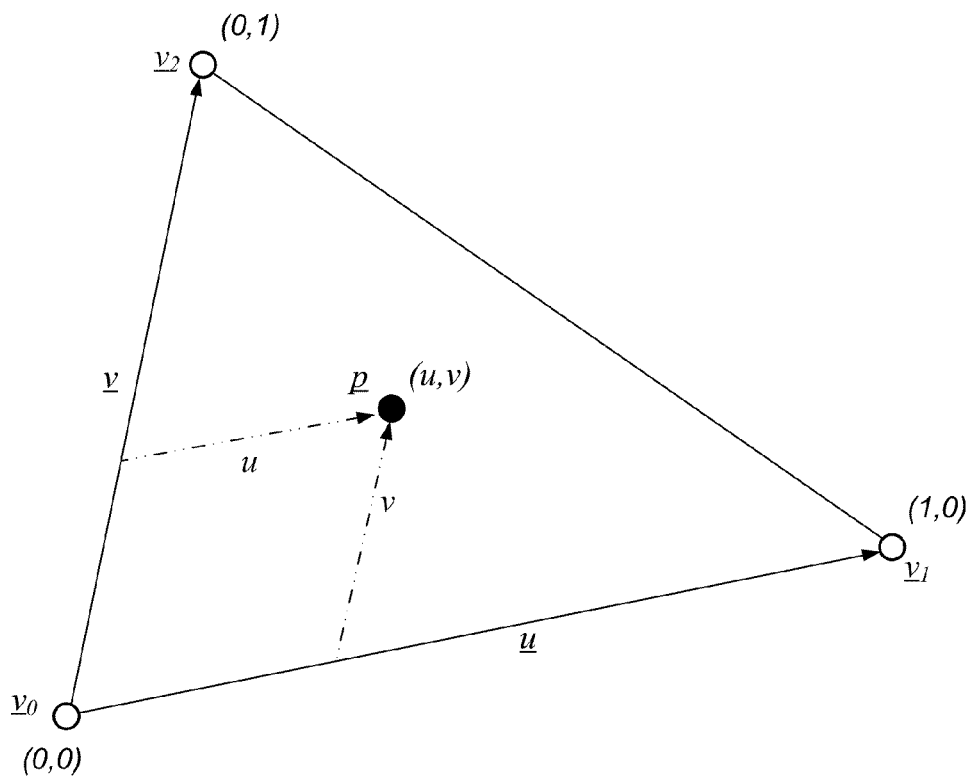
FIG. 6 illustrates an example of the 2D triangular domain embedded in a 3D domain.

An example illustration of the 2D triangular domain embedded in a 3D domain is shown in FIG. 6. In one embodiment, the 2D triangular domain may be defined by vertices $\underline{v}_0$, $\underline{v}_1$ and $\underline{v}_2$. A local 3D coordinate system may consist of an origin located at $\underline{v}_0$ and two coordinated vectors $\underline{u}$ and $\underline{v}$ defined by $(\underline{v}_1 - \underline{v}_0)$ and $(\underline{v}_2 - \underline{v}_0)$ respectively. Using this local 3D coordinate system, any point within the triangular domain can be defined in terms of the coordinate pair (u,v) with the conditions $0 \leq (u,v) < 1$ and $(u+v) < 1$. Mapping from the global 3D coordinate system to the local 2D coordinate system may be computed by: $\underline{p} = \underline{v}_0 + u\underline{u} + v\underline{v}$.

Figure 7:
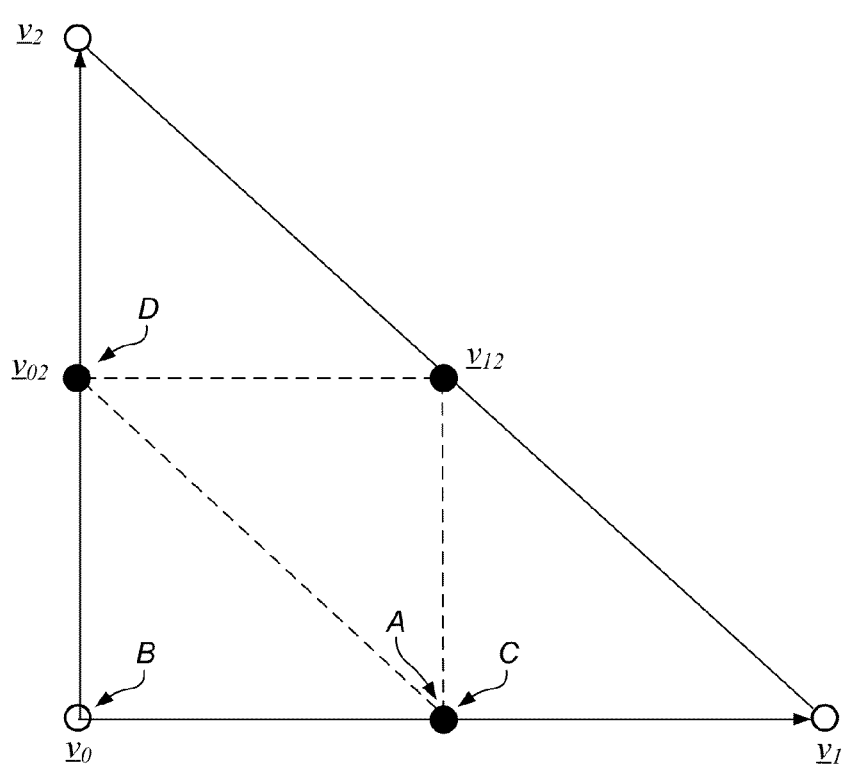
FIG. 7 illustrates an example subdivision of the 2D triangular domain, according to some embodiments.

Turning back to FIG. 1, four sub-triangles may be generated within each triangle, as indicated at 120. In one embodiment, the 2D triangular domain may be subdivided into four non-overlapping sub-domains. One example of triangular subdivision is shown in FIG. 7. As shown in FIG. 7, the 2D triangular domain may be subdivided by joining the midpoints of each side of the top-level domain. In terms of the local coordinate system shown in FIG. 6, the four sub-domains may be defined by the following conditions:

$$A: \left(0 \leq (u, v) < \frac{1}{2}\right), \left((u + v) \geq \frac{1}{2}\right)$$

$$B: \left(0 \leq (u, v) < \frac{1}{2}\right), \left((u + v) < \frac{1}{2}\right)$$

$$C: \left(\frac{1}{2} \leq u < 1\right), \left(0 \leq v < \frac{1}{2}\right), ((u + v) < 1)$$

$$D: \left(0 \leq u < \frac{1}{2}\right), \left(\frac{1}{2} \leq v < 1\right), ((u + v) < 1)$$

In addition, each of the four sub-domains may include a base or origin point. For example, the base points associated with each domain may be the following:

| A: $v_{01}$ | B: $v_0$ | C: $v_{01}$ | D: $v_{02}$ |
|---|---|---|---|

In the example shown, the four sub-triangles, A, B, C, and D may be geometrically identical to each other. Note, however, that sub-triangle A is rotated 180 degrees in relation to the other three sub-triangles. The orientation of sub-triangle A may be denoted as "down" and sub-triangles B, C, and D as "up." Using the same notation, the top level triangle of FIG. 6 may also be denoted as "up." In the embodiment shown in FIG. 7, the base/origin point of a triangle may be the bottom-left vertex of an up triangle and the bottom-right vertex of a down triangle. Using that notation, sub-triangles A and C may have the same base point.

Figure 8:
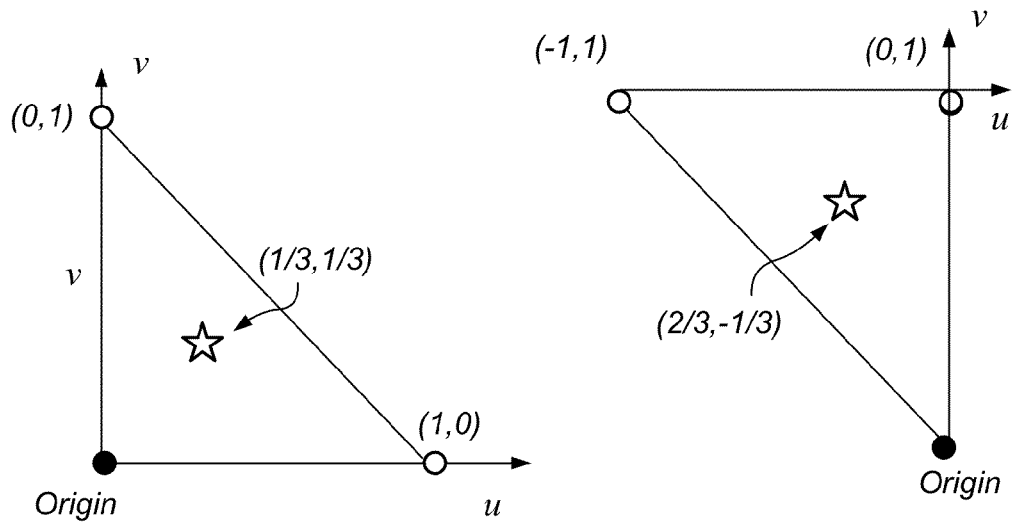
FIG. 8 illustrates one form of notating centroids of sub-triangles.

FIG. 8 illustrates centroids of the sub-triangles. As shown in FIG. 8, for a triangle with sides u and v, of unit length, the centroid (i.e., center of mass) of the triangle may be given with respect to the local origin as (⅓, ⅓) for up triangles and (⅔, −⅓) for down triangles. For example, beginning with an arbitrary top level triangle, the centroid of that triangle in local coordinates may be given by (u,v)=(⅓, ⅓). The local coordinates may be translated into global (x, y, z) coordinates with $\underline{p} = \underline{v}_0 + u\underline{u} + v\underline{v}$. The local coordinates of the centroids of the four sub-triangles may be determined by applying an appropriate translation and scaling to the centroid for the appropriately oriented full-size triangles. Accordingly, the centroid of sub-triangles A-D of FIG. 7, in terms of local coordinates, may be given by: A*=(⅓, ⅓); B*=(⅙, ⅙); C*=(⅔, ⅙); D*=(⅙, ⅔).

Figure 9:
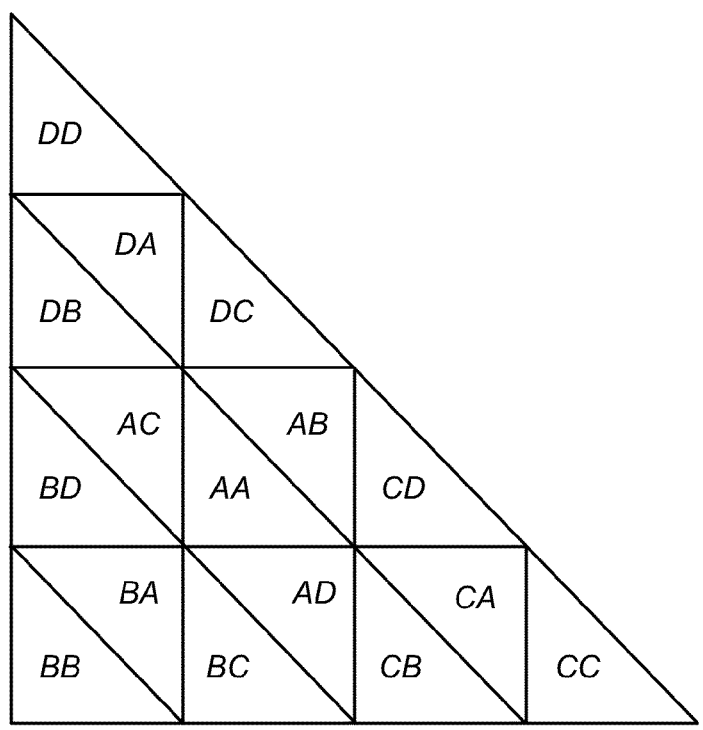
FIG. 9 illustrates an example recursive subdivision of the 2D triangular domain.

Turning back to FIG. 1, the method may include repeating block 120 until a depth level has been reached, as shown at 130. The depth level may correspond to a target resolution, or a variance or entropy threshold. In this manner, the subdivision of 120 into four sub-triangles may be performed recursively. An example of a recursive subdivision of a triangle is shown in FIG. 9. As shown, the top level triangle is subdivided two levels deep. In other words, the top level triangle is subdivided at the first level, and each sub-triangle of the first subdivision is subdivided at the second level. As a result, this example subdivided triangle includes 16 second level sub-triangles. For notation simplicity, the second level sub-triangles may be labeled as AA, AB, AC, AD, BA, BB, BC, BD, . . . where the left-most symbol represents the first level sub-triangle, and the second symbol represents the division within that sub-triangle. The recursive subdivision can continue indefinitely to generate an Nth level subdivision containing $4^N$ Nth level sub-triangles. The sub-triangles can be labeled by extending the above notation scheme as follows: $\gamma_0 \gamma_1 \gamma_2 \gamma_3 \ldots \gamma_N$ with $\gamma_i$:(A|B|C|D). In one embodiment, the centroid of each of the 16 second level sub-triangles can be calculated by applying an appropriate translation and scaling to the first level values illustrated above.

The local coordinate axes u and v and the recursive subdivision of the triangle may provide two complementary coordinate systems for identifying a point within an arbitrary triangle to a desired precision. In other words, a point may be identified using a pair of coordinate values (u, v) and at the same time, the same point may be identified using a string of symbols, $\gamma_0 \gamma_1 \gamma_2 \gamma_3 \ldots \gamma_N$ with $\gamma_i$:(A|B|C|D). For example, consider a case where two 8-bit bytes are used to specify (u, v) coordinates within a triangle. The two 8-bit bytes may be used to specify 32,768 points within the triangle (one half of the 65,536 points within a 256×256 square). Or, in the recursive subdivision coordinate system, the 16 bits may be broken into 8 2-bit pairs and used to specify a recursive address that can identify $4^8$ sub-triangles, which also corresponds to 65,536 individual points. In one embodiment, the u, v address can map to the recursive address, and vice versa, by using a 65,536 sized 2-byte look up table (LUT). The LUT for mapping from u, v to recursive address may contain 32,640 points which may not map into the triangle. Those points can be mapped to the recursive address of their nearest diagonal value. Conversely, the LUT for mapping from recursive address to a u, v address may include a twofold degeneracy, (i.e., two recursive addresses for each u, v address).

At 140, the method may include sampling a field over a plurality of leaf nodes. In this manner, a recursive triangle based tree, or Tri-Tree object, can be built from the bottom up. Leaf nodes are defined herein as the lowest level nodes of a tree (i.e., for an Nth level recursive triangle tree, the nodes at the Nth level that do not have children nodes). Non-leaf nodes, therefore, are the nodes that have children nodes. Examples of fields that may be sampled include light masks/maps, RGB images (from high resolution 2D cameras), shadow maps, or visibility maps. In one embodiment, the fields may be pre-computed, for example, with a ray tracing algorithm. In some embodiments, a minimum sample area may be specified. The sample area can then be converted into a recursive depth, or target depth, based on the overall size of the top-level triangle. With the recursive depth known, the tree can be recursively sampled at each leaf node. In one embodiment, converting from a recursive address to a point in local triangle coordinates can be done with the use of a LUT.

In some embodiments, the sampling of the field may be performed at a centroid for a given sub-triangle of depth D. In some embodiments, sampling may be performed at one or more vertices of a sub-triangle.

As indicated at 150, a field value for a plurality of non-leaf nodes may be calculated at each level of the recursion. In one embodiment, the sampled leaf nodes can be recursively averaged to provide an averaged value at each non-leaf node in the tree until reaching an overall average for the top-level triangle. As an example, let the average value of some field over a triangular region be denoted by $F_0^0$, and the average value of the same field within first level sub-triangles B, C, and D be denoted as $F_1^B, F_1^C, F_1^D$. The average value of the field for the fourth first level sub-triangle, A, may then be computed with $F_1^A = 4F_0^0 - (F_1^B + F_1^C + F_1^D)$. Accordingly to the previously described notation, the average field value within a sub-triangle A of depth N may be given by:

$$F_N^{Y0Y1Y2-YN-2A} = 4F_{N-1}^{Y0Y1Y2-YN-2} - (F_N^{Y0Y1Y2-YN-2B} + F_N^{Y0Y1Y2-YN-1C} + F_N^{Y0Y1Y2-YN-1D})$$

Accordingly, as discussed below, this may allow fewer than all of the average field values at a given subdivision level to be stored.

As illustrated at 160, the children nodes whose field values (e.g., average field values) are less than a specified level of variance may be pruned or truncated. The pruning may take place in a recursive manner to remove or replace nodes that have less than a specified level of entropy or variance. For example, in one embodiment, the branches of the tree which are found to have zero (lossless) or low (lossy) entropy may be truncated. In one embodiment, if the specified variance is greater than zero, pruning may include complete removal of a node in the case of lossy compression. Pruning may also include replacement with a smaller object in the case of less-lossy or lossless compression. Once a branch has been truncated, the branch may, in some embodiments, no longer restart further down the tree.

Data relating to each triangle in a simplicial complex may be stored in the form of a hierarchical tree of partitioned sub-triangles, with each tree being known as a Triangle-Tree. Each level of a Triangle-Tree may represent a resolution component of the data field over the top level triangle. At 170, the average field values of non-pruned nodes may be serialized or stored by level of recursion, according to some embodiments. By storing the average field values by level of recursion, the TriTree object may load depth resolution layers in sequence and only as far as needed, i.e., on demand in an incremental fashion. After serializing by resolution layer, 170 may serialize by particular triangles. This may further augment an on demand loading system in that the system may only have to send bytes suitable for a particular view. In one embodiment, serialization may be partitioned to facilitate reading in only the values for a particular view. Partitioning may be a tree type structure, such as a kd-tree. Nodes of the kd-tree can be independently serialized, which may allow the resolution component for a neighborhood of triangles to be loaded on demand. In one embodiment, the resolution component for the neighborhood of triangles may be loaded on demand without the need to de-serialize the entire dataset. Accordingly, bytes that are geometrically close to each other may be stored nearby which may aid interactive views, such as a web browser view where the server may need to read in just the value required to service a particular view. In other embodiments, a user may choose a structure and order in which each mesh triangle is serialized. An order may be in the triangle order, or as a tree structure with some indexing array so they values can be read in more selectively.

In one embodiment, storing the average field values of the depth level sub-triangles may include storing fewer than all of the sampled leaf nodes. As mentioned above, having the calculated average field value for a level of recursion and average field values for three of the sub-triangles allows for recovery or estimation of the average field value for the fourth sub-triangle. Thus, at the depth level, or lowest level (i.e., N) of the recursion, three of the four average field values of the sub-triangles may be stored as well as the average field value of the (N−1)th level triangle that is parent to the depth level triangles. Accordingly, in one embodiment, only three new values need to be stored for each subdivision, or $3^N$ for an entire level of depth N, in order to estimate the value of the fourth sub-triangle. In fixed point arithmetic, however, 4 numbers plus their average (the average field value of each of the four sub-triangles and their average value of the parent triangle) is equivalent to 4.25 independent numbers. In other words, one of the numbers may not be exactly recovered from the other three plus their average. At a given resolution level, the imprecision of an estimated fourth value may not be significant. Within a multi-resolution system, though, the imprecision may be compounded without reading in an actual value in lieu of an estimated value. In one embodiment, described in FIG. 2, the method may employ a delayed reading, or dynamic loading, scheme. In short, the delayed reading scheme allows for the postponing of the reading of the $4^{th}$ value until reading the next resolution level down the tree. Utilizing the delayed reading scheme may reduce storage requirements by about 25%. In conjunction with branch truncation/pruning, storage savings may exceed 25%. In one embodiment, blocks 160 and 170 may be performed in a different order. For example, average field values may be stored in accordance with the delayed reading scheme followed by pruning In other embodiments, blocks 160 and 170 may be performed simultaneously. The stored TriTree object of FIG. 1 may be known as a TriFull tree.

The methods disclosed herein may be used to serialize a complete mesh of triangles. An entire set of field values for a single field, such as a light source, over all triangles may be referred to as a Field-Map (or Light-Map). Light-Maps may be serialized into a single field, which may or may not be added into a secondary sub-storage. The design of the serialization scheme for a Light-Map may reflect the likely order in which components may be used by a client rendering system. In other words, values for triangles that are close geometrically may be grouped together in the file. To enable this, a partitioning scheme may be employed that divides the mesh into sets of triangles with each triangle featuring in exactly one set. Details of the partitioning may be explicitly written into the Light-Map file allowing any partitioning scheme to be employed. For example, a single kd-tree may be used. In other embodiments, partitioning may be optimized for each light source. Details of the light source may also be written into the file.

As shown at 180, the field may be specified over a domain of general topology as part of a render pipeline. In one embodiment, the stored average field values may be read and the average field values of the unpruned, unstored nodes may be estimated. The read and estimated values may be used to compute re-sampled values of a field, which can, in turn, be supplied to a pixel pipeline. Reading the stored average field values and estimating the field values of the unpruned, unstored nodes are collectively one aspect that can be implemented according to the delayed reading scheme. In essence, the reading of the $4^{th}$ value may be postponed until reading the next resolution level because an estimate of the $4^{th}$ value, based on the average value for the previous level and three of the values for the current level may provide sufficient accuracy.

The stored and estimated values of the Tri-Tree object may be used to specify texture images as part of a render pipeline within a rendering environment (e.g., OpenGL, Direct3D, etc.) to supply appropriate values of some render-related field to a pixel-pipeline. The process of supplying appropriate values in this way is a form of re-sampling. One input to the re-sampling process may be the specification of the position and size of the pixel within the field that is being re-sampled. The size of the pixel as a fraction of the triangular domain may be used to determine how deep into the tree structure the re-sampling may go. As an approximation, if X pixels project into the triangle, then re-sampling may be able to go to a depth N in the tree such that $4^N \geq X$. The values of X and N may be calculated as a byproduct of a scanline algorithm, which may be used in the rendering environment. The field value may be specified in terms of the local coordinates of the triangle (u,v). The tree structure may be queried using a floating point u,v coordinate down to the required depth and retrieve the field value at that location.

Figure 10:
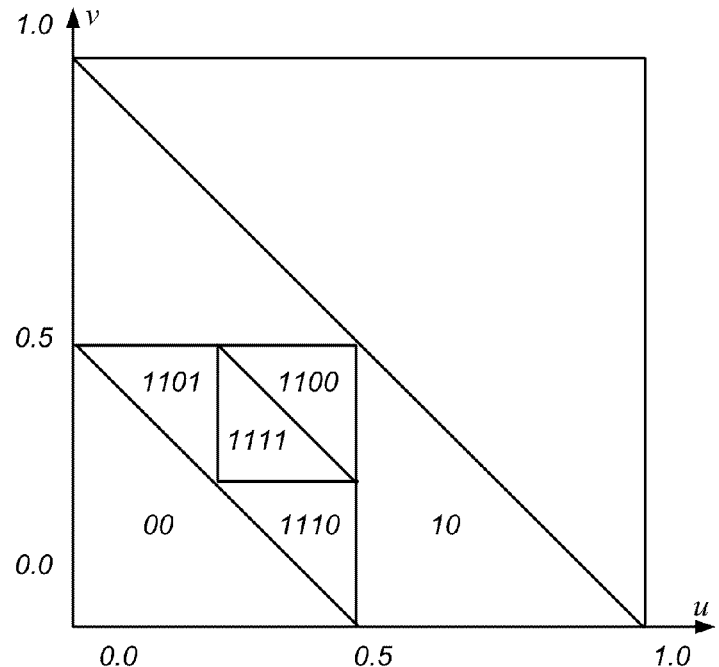
FIG. 10 illustrates an example recursive subdivision that may be used in a re-sampling process.

Consider the following example, as shown in FIG. 10. As mentioned above, for a given number of bits, the recursive address scheme may be able to address twice as many sub-triangles as a simple u,v scheme because it addresses squares instead of triangles and half of the squares lie outside the parent triangle. A u,v address may be used to identify a sub-square within the large square of FIG. 10 for a given depth. The u,v address can be used to index into a LUT which yields a recursive address. However, in certain situations, the square may lie either partly or entirely outside the triangular domain or may contain two sub-triangles of the required depth. To address these situations, a third coordinate, w, may be used such that u+v+w=1.0, which yields w=1.0−(u+v). To land within the triangle, w may be less than or equal to zero. Using w, (u,v) can be converted into an index into a full-sized LUT. Consider a recursive depth of D that may require 2D bits to address each of the $4^D$ potential sub-triangles (may be lower with some truncated branches). To determine the recursive address of the triangle in which a particular u,v coordinate is located, w may first be calculated and it may be determined if the point lies within the triangular domain. Next, the normalized floating point u,v may be multiplied by P, where P=(1<<D), resulting in uF,vF. uF,vF may be truncated to integer values to give uI,vI. The integer coordinates can then be used to locate the point within one of the 4D sub-squares within the square domain spanned by u,v. After locating the point, which sub-triangle within the sub-square contains the point can be determined by calculating w=1.0−{(uF−uI)+(vF−vI)}. If w>0, the point may be within the upper-right triangle and uI,vI may be transposed to resolve the degeneracy. Finally, uI,vI may be combined as {(uI<<D)|vI} to create a unique index into a LUT that converts the original normalized floating point coordinates into a unique address within the triangular tree. Using the TriFull tree, the LUT may convert the u,v pair into a recursive address (a sequence of bit-pairs) that can be used to walk down the tree to the required location—or as close as possible given any truncation. In the case of a TriFlat tree, described below in FIG. 3, the LUT may convert the u,v pair directly into the index of the required field value within the tree. In either case, the value of the field average over the triangle contained the target pixel may be retrieved from the data structure and provided to the re-sampling process.

Figure 11:
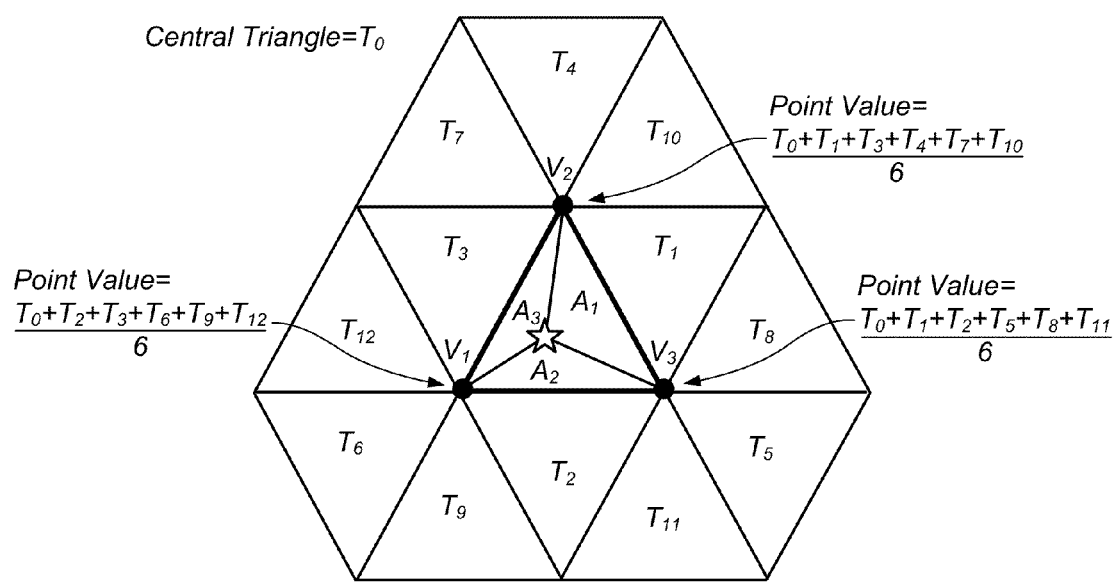
FIG. 11 illustrates interpolation using a TriFull object, according to some embodiments.
Figure 13:
FIG. 13 illustrates an example of a TriFull, nearest-neighbor interpolation applied to a regular raster image.

Re-sampling may include a variety of built-in techniques including: nearest-neighbor, linear, inter-triangle, cross-triangle, cubic, higher order, or other forms of interpolation. In some embodiments, each triangle-tree may be equipped with a pointer to its 3 neighboring trees. The pointers may be set to NULL or to a self-reference to allow discontinuous or reflective type boundary conditions to be implemented. In the case of nearest-neighbor re-sampling, the sub-triangle that a target pixel falls within may be located and passed to the rendering pipeline. An example of a regular raster image rendered using TriFull and nearest-neighbor interpolation is illustrated in FIG. 13. To minimize pixilation, the pixels and view-projected sub-triangles may be of a similar size. To further minimize pixilation, higher levels of interpolation may be used. In one embodiment, linear interpolation may be used by exploiting the natural linear basis functions of the triangle. One example of a linear interpolation is illustrated in FIG. 11. As shown, the triangle, $T_0$, where the target pixel projects may be identified along with the 12 triangles that are adjacent to the identified triangle. The underlying field value at each of the three vertices of Triangle $T_0$ may be estimated as the average of the averages within each of the 6 adjacent triangles. Accordingly, the point values at vertices $V_1$, $V_2$, and $V_3$ may be computed as:

$$\frac{T_0 + T_2 + T_3 + T_6 + T_9 + T_{12}}{6}, \frac{T_0 + T_1 + T_3 + T_4 + T_7 + T_{10}}{6}, \text{ and}$$
$$\frac{T_0 + T_1 + T_2 + T_3 + T_8 + T_{11}}{6},$$

respectively. The value of the pixel may then be given by $$F = \frac{F_1 A_1 + F_2 A_2 + F_3 A_3}{A},$$

where $A_i$ is the area of the triangle subtended by vertex $V_i$, $F_i$ is the averaged field value at $V_i$ and A refers to the total area of a triangle at the target resolution level.

Utilizing hierarchical and multi-resolution triangular maps may offer many advantages. First, the maps may be well suited to partitioning methods that allow the maps to be used as part of a dynamic loading scheme. Second, continuity may exist across triangles. Because the sides of the triangles may be divided, continuity conditions may exist between adjacent triangles. If the triangles share a same side and a division is on the same side, then continuity of the field may exist. Third, the recursive structure may allow for built-in compression and may allow for a multi-resolution system. As discussed below regarding FIG. 2, the structure provides a simple transition to a next lower level of resolution. Finally, using an adaptive recursion to create the triangular maps may reduce storage size and improve compute speed and ultimately alleviate some of the typical re-sampling problems that are commonly encountered when using fields as part of an accurate and efficient render pipeline. The end result may be improved realism of the rendering.

Figure 2:
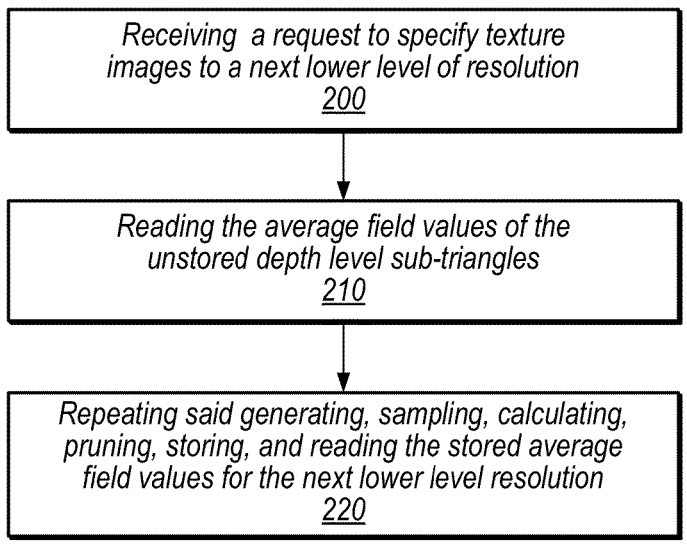
FIG. 2 is a flowchart of a delayed read method of representing a field over a triangular mesh, according to some embodiments.

Turning now to FIG. 2, one embodiment of a delayed read method of representing a field over a triangular mesh is shown. While the blocks are shown in a particular order for ease of understanding, other orders may be used. In some embodiments, the method of FIG. 2 may include additional (or fewer) blocks than shown.

In one embodiment, the method of FIG. 2 may include blocks 100-180 of the method of FIG. 1. At 200, a request to specify texture images to a next lower level of resolution may be received. In one embodiment, the request to specify texture images to a next lower level of resolution may include a request to zoom in to a lower level. The request to specify texture images to a next lower level of resolution may be seen as a request for an on demand load. In one embodiment, the request may be performed in an incremental fashion allowing depth resolution layers to be loaded in sequence and only as far as requested.

As shown at 210, the average field values of the unstored depth level sub-triangles may be read. The structure of the subdivision means that a parent triangle of the depth level sub-triangles may contain pointers from zero (all truncated) to 4 children. As the layer is initially read, storage space may initially be allocated for only 3 values. When the layer is read in block 210, though, in response to the request to specify texture images to a next lower level of resolution, the triplets may be expanded to quads and the value that was previously estimated may be read. In addition, the value the fourth value that was previously unstored may be stored.

At 220, the generating, sampling, calculating, pruning, storing, and reading the stored average field values of the method of FIG. 1 may be repeated for the next lower level resolution. In one embodiment, before reading/writing a new layer, the maximum number of triplets that the new layer can contain, based on the current truncation/pruning state of the tree, may be estimated. The minimum number of bytes needed to assign a bit for each of the triplets may then be calculated. When writing, the bits are set based on which layers are actually present (i.e., which have survived thresholding) and the actual layers may be written in the natural tree order. Upon reading, the required number of bytes may be read first and the number of '1's may be counted. The number of triplets may then be read into a buffer. The byte-flags and value array may be passed to the tree in the natural order and each subdivision may consume a bit from the byte-flag and, if the bit is 1, may also consume a triplet from the value array. In one embodiment, the number of delayed reads and the maximum number of triplets to be read (e.g., based on truncation, etc.) may be known. Which ones have been truncated and should be omitted from the next layer may be encoded at the beginning of the triplet section using one bit per triplet.

The delayed read scheme may allow for a more efficient rendering environment in terms of storage. Not only can the delayed read result in a storage savings of about 25% of the lowest level of the tree structure but the hierarchical structure of the tree may provide a mechanism to read in the value of the previously unstored nodes so that fine precision may be maintained at lower levels of the tree, when requested.

Figure 3:
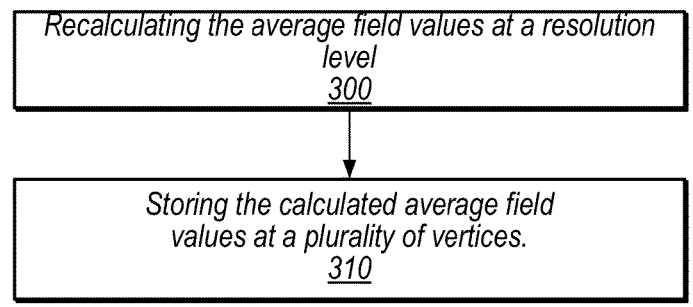
FIG. 3 is a flowchart of a method of representing a field over a triangular mesh, according to some embodiments.

Turning now to FIG. 3, one embodiment of a method of representing a field over a triangular mesh is shown. While the blocks are shown in a particular order for ease of understanding, other orders may be used. In some embodiments, the method of FIG. 3 may include additional (or fewer) blocks than shown.

In one embodiment, the method of FIG. 3 may include blocks 100-170 of the method of FIG. 1. At 300, the average field values at a resolution level may be recalculated. The reconstructed average field values at a resolution level may be known as a TriFlat tree object. In one embodiment, the TriFull tree object may be constructed first and the recalculated average field values, or TriFlat tree object, may be derived from the TriFull tree. The TriFull tree may include all field values (in a compressed form) from the top level down to a level N depth while the TriFlat tree may contain only the field values for a particular level. If a view in a rendering engine changes so that the TriFlat tree is no longer appropriate, the method of FIG. 3 may be repeated to quickly generate another TriFlat object that may be stored in texture cache. A given TriFlat tree may be suitable for a number of different views such that constant generation of new TriFlat trees in the context of using a rendering engine may not be necessary. Further, different resolutions of TriFlat trees may be generated depending on a projected size of the triangle. If, in a particular view, the triangle is small, a course TriFlat tree (grid) may be used. On the other hand, if a triangle is large (zoomed in), a finer grid may be used.

Figure 12:
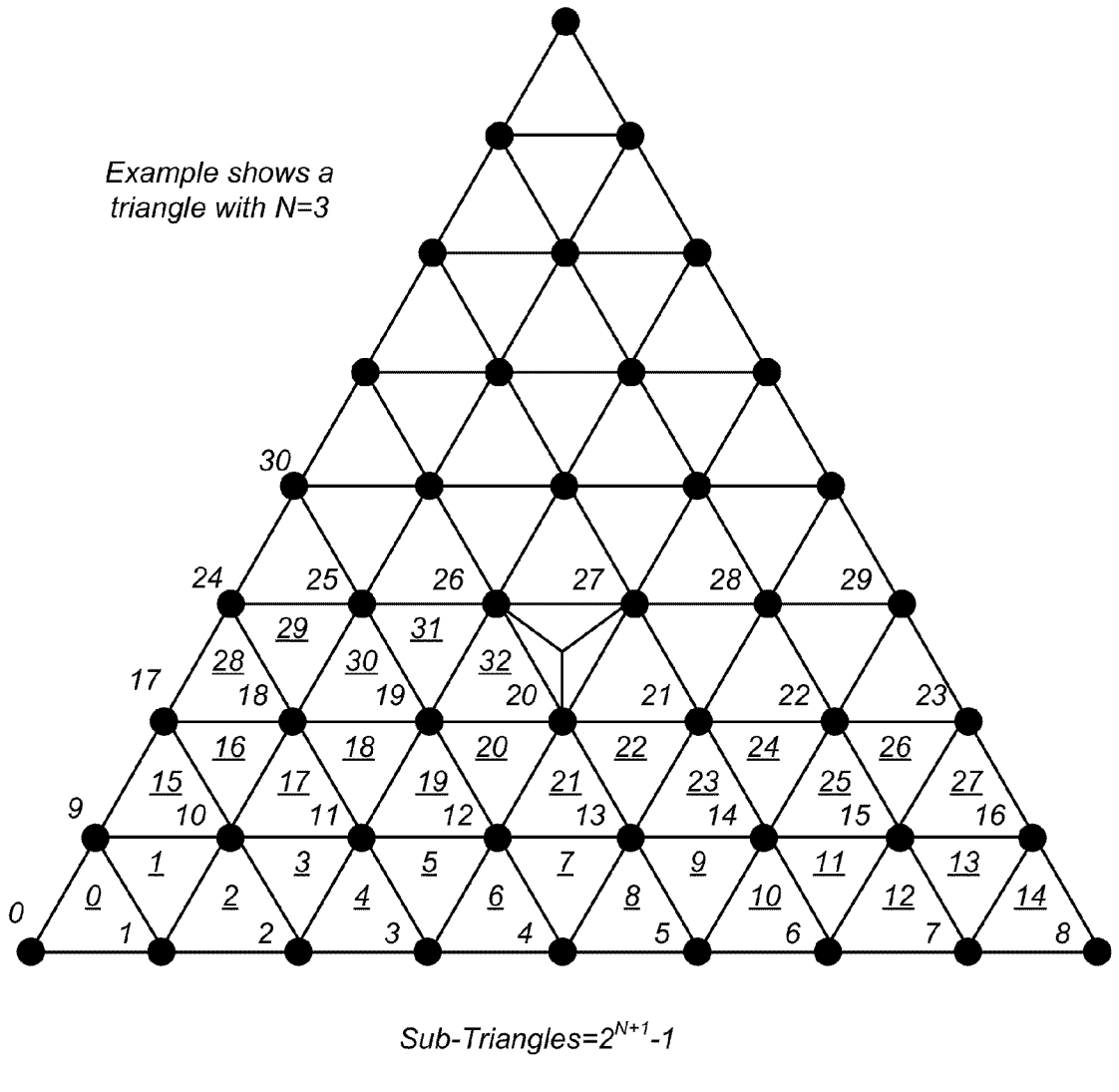
FIG. 12 illustrates interpolation using a TriFlat object, according to some embodiments.

At 310, the calculated average field values at a plurality of vertices may be stored. In one embodiment, TriFlat object may be cached in texture memory. In one embodiment, the values of the field over each sub-triangle adjacent to each vertex may be re-averaged. This one-off operation can be achieved by using LUTs for the required depth, which list the sub-triangles for each vertex. In one embodiment, the sub-triangles may be of equal shape and area such that implementing an explicit weighting may not be necessary. In other embodiments, an explicit weighting may be used. The vertices on the edge of the top-level triangle may be averaged with field values from adjacent top-level triangles. In that instance, the values may be weighted by the area of the top-level triangle. Adjacent top-level triangles may be included in the averaging calculations depending on the boundary conditions at the common edge. If adjacent top-level triangles are included, a pointer to the appropriate top-level triangles may facilitate the calculations. The result of the calculations may be a TriFlat tree that includes a list of field values whose length may be used to identify its depth. The re-sampling process described above may operate in a different manner when using a TriFlat object. In one embodiment, flattening the recursive hierarchy of a TriFull object with a flat, linear data structure that contains a value for every node at a specified resolution depth may enable faster re-sampling and interpolation at the potential expense of additionally memory requirements. FIG. 12 illustrates interpolation using a TriFlat object with a depth of N=3. The figure shows the flattened numbering order for sub-triangles and sub-triangle vertices that may be used to serialize the average field values within the TriFlat object. To facilitate the conversion of floating point u,v coordinates into sub-triangle indices and to further facilitate determining the vertex indices for each sub-triangle, the following LUTs may be used: sTriVerts[i][d] and sVecToTri[i][d]. sTriVerts[i][d] may contain a LUT for each sub-triangle index i at depth d. Each entry may consist of a triple of integers specifying the index of each of the 3 vertices for that sub-triangle. sVecToTri[i][d] may contain a LUT for each depth d that converts a serialized u,v coordinate i into a sub-triangle number. One example of converting a normalized floating point u,v to an index i is as follows:

int delta=2^N;

double $ud=u*delta$;

double $vd=v*delta$;

int $iU$=(int)$ud$ int $iV$=(int)$vd$ double sub$U=ud$−(double)$iU$ double sub$V=vd$−(double)$iV$ double $w$=(sub$U$+sub$V$)−1.0 int index=($w$<0.0)?$u+v*$delta:delta*(delta−$v$)−$u$−1

Figure 14:
FIG. 14 illustrates an example of a TriFlat, linear interpolation applied to a regular raster image.

Linear interpolation over a TriFlat object may proceed in a straightforward manner because the average values at the vertices of each triangle may be pre-computed by the above scheme. Using a TriFlat object may allow for greater retrieval speed by storing actual field values in a flat structure that can be quickly queried with a simple u,v coordinate. An example of a regular raster image rendered using TriFlat and linear interpolation is illustrated in FIG. 14.

Using a TriFlat tree object may be useful in interactive rendering environments. For example, a TriFlat tree may provide quick rendering with OpenGL by improving interpolation efficiency. Because the TriFull tree is also available, whenever a view changes to the point where a TriFlat tree is no longer appropriate, an appropriate TriFlat tree may be quickly generated from the TriFull tree and cached in texture memory for the next rendering view. Further, a rendering system may assign an approximately fixed amount of fast-storage to a data field and quickly retrieve the components it needs for a given view on demand.

Example Implementations

Figure 4:
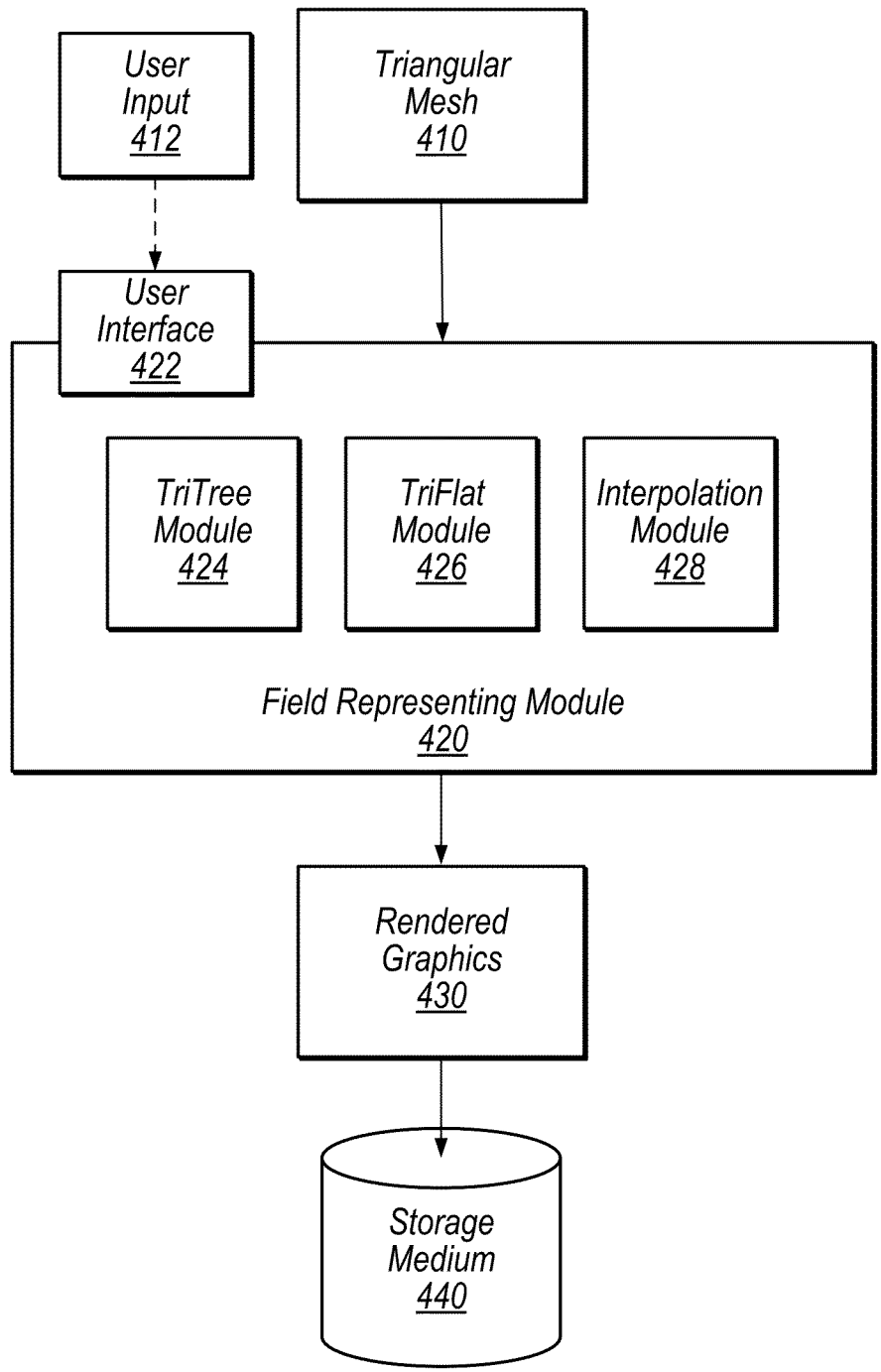
FIG. 4 illustrates a module that may implement representing a field over a triangular mesh, according to some embodiments.
Figure 5:
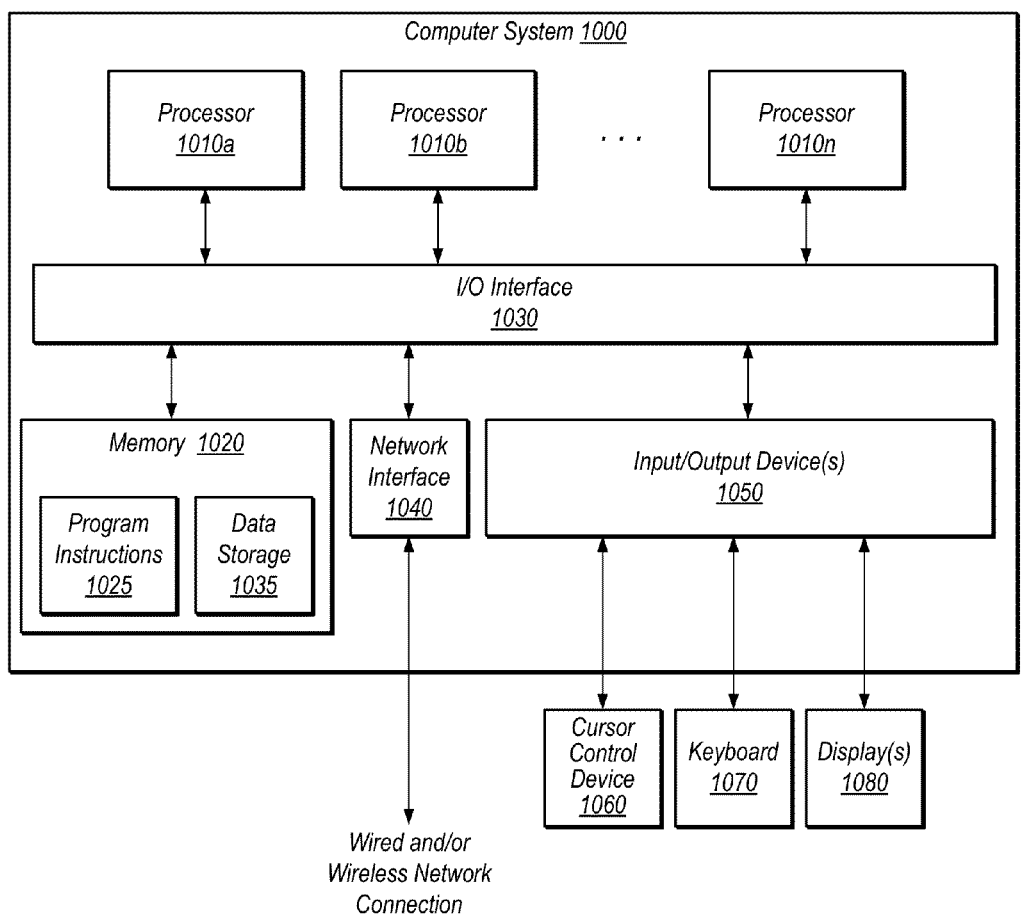
FIG. 5 illustrates an example computer system that may be used in embodiments.

FIG. 4 illustrates a field representing module that may implement one or more of the field representing techniques and tools illustrated in FIGS. 1 through 3. Field representing module 420 may, for example, implement one or more of a TriTree module 424, TriFlat module 426, and interpolation module 428. FIG. 5 illustrates an example computer system on which embodiments of field representing module 420 may be implemented. Field representing module 420 may receive as input a triangular mesh 410. Field representing module 420 may receive user input 412 via user interface 422. For example, a user may specify a particular order and structure in which to serialize the TriTree structure via user interface 422. Or, a user may specify a particular view or resolution layer of a rendering engine. Field representing module 420 may create a TriTree structure, for example, a TriFull and/or TriFlat structure. Field representing module 420 may also interpolate the TriTree structure to a 3D model within a rendering engine to create rendered graphics 430. Rendered graphics 430 may, for example, be stored to a storage medium 440, such as system memory, a disk drive, DVD, CD, etc.

Example System

Embodiments of a field representing module and/or of the field representing techniques as described herein may be executed on one or more computer systems, which may interact with various other devices. One such computer system is illustrated by FIG. 5. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein may, at least in part, be implemented by program instructions configured for execution on one of, or parallel execution on two or more of, such GPUs. The GPU(s) may implement one or more APIs that permit programmers to invoke the functionality of the GPU(s). Suitable GPUs may be commercially available from vendors such as NVIDIA Corporation, ATI Technologies (AMD), and others.

GPUs, such as one or more of processors 1010 may be implemented in a number of different physical forms. For example, GPUs may take the form of a dedicated graphics card, an integrated graphics solution and/or a hybrid solution. GPU 1010 may interface with the motherboard by means of an expansion slot such as PCI Express Graphics or Accelerated Graphics Port (AGP) and thus may be replaced or upgraded with relative ease, assuming the motherboard is capable of supporting the upgrade. However, a dedicated GPU is not necessarily removable, nor does it necessarily interface the motherboard in a standard fashion. The term "dedicated" refers to the fact that hardware graphics solution may have RAM that is dedicated for graphics use, not to whether the graphics solution is removable or replaceable. Dedicated GPUs for portable computers may be interfaced through a non-standard and often proprietary slot due to size and weight constraints. Such ports may still be considered AGP or PCI express, even if they are not physically interchangeable with their counterparts.

Integrated graphics solutions, or shared graphics solutions are graphics processors that utilize a portion of a computer's system RAM rather than dedicated graphics memory. For instance, modern desktop motherboards normally include an integrated graphics solution and have expansion slots available to add a dedicated graphics card later. As a GPU may be extremely memory intensive, an integrated solution finds itself competing for the already slow system RAM with the CPU as the integrated solution has no dedicated video memory. For instance, system RAM may experience a bandwidth between 2 GB/s and 8 GB/s, while most dedicated GPUs enjoy from 15 GB/s to 30 GB/s of bandwidth. Hybrid solutions may also share memory with the system memory, but may have a smaller amount of memory on-board than discrete or dedicated graphics cards to make up for the high latency of system RAM. Data communicated between the graphics processing unit 1010 and the rest of the computer system 1000 may travel through a graphics card slot or other interface, such as I/O interface 1030 of FIG. 5.

Note that program instructions 1025 may be configured to implement a graphics application as a stand-alone application, or as a module of another graphics application or graphics library, in various embodiments. For example, in one embodiment program instructions 1025 may be configured to implement graphics applications such as painting, editing, publishing, photography, games, animation, and/or other applications, and may be configured to provide the functionality described herein. In another embodiment, program instructions 1025 may be configured to implement the techniques described herein in one or more functions or modules called by another graphics application executed on GPU 1010 and/or processor(s) 1010 (e.g., a TriTree module, a TriFlat module, or an interpolation module). These modules may be executable on one or more of CPUs 1010 and/or GPUs 1010 to cause computer system 1000 to provide the functionality described herein. The graphics application may be implemented in various embodiments using any desired programming language, scripting language, or combination of programming languages and/or scripting languages, e.g., C, C++, C#, Java™, Perl, etc. For example, in one embodiment, the graphics application may be JAVA based, while in another embodiments, it may be implemented using the C or C++ programming languages. In other embodiments, the graphics application may be implemented using specific graphic languages specifically for developing programs executed by specialized graphics hardware, such as a GPU. In addition, the graphics application may be embodied on memory specifically allocated for use by graphics processor(s), such as memory on a graphics board including graphics processor(s). Program instructions 1025 may also be configured to render images and present them on one or more displays as the output of an operation and/or to store image data in memory 1020 and/or an external storage device(s), in various embodiments.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. System memory 1020 may represent any of various types and arrangements of memory, including general-purpose system RAM and/or dedication graphics or video memory. In the illustrated embodiment, program instructions and data implementing desired functions, such as those described above for embodiments of a field representing module are shown stored within system memory 1020 as program instructions 1025 and data storage 1035, respectively. Data storage 1035 may include one or more data structures, such as one or more data structures configured to store data representing one or more input images, output images, intermediate images, 3D surface meshes, texture maps, and/or sets of 2D texture coordinates. In some embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 5, memory 1020 may include program instructions 1025, configured to implement embodiments of a field representing module as described herein, and data storage 1035, comprising various data accessible by program instructions 1025. In one embodiment, program instructions 1025 may include software elements of embodiments of a field representing module as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a field representing module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present disclosure may be practiced with other computer system configurations.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof The order of method may be changed, and various elements may be added, reordered, combined, omitted, modified, etc.

Various modifications and changes may be made as would be obvious to a person skilled in the art having the benefit of this disclosure. It is intended that the disclosure embrace all such modifications and changes and, accordingly, the above description to be regarded in an illustrative rather than a restrictive sense.

What is claimed is:

1. A method, comprising:
 receiving a three-dimensional (3D) triangular mesh comprising a plurality of triangles;
 creating a two-dimensional (2D) triangular map for each triangle of the plurality of triangles, wherein the creating comprises:
  generating a plurality of sub-triangles within each triangle;
  recursively repeating the generating for each sub-triangle until reaching a depth level, wherein the depth level depends on at least one of a target resolution or an entropy threshold;
  sampling a field at a respective point within each of a plurality of leaf nodes, wherein each leaf node of the plurality of leaf nodes represents one of the sub-triangles at the depth level;
  calculating a field value for a plurality of non-leaf nodes at each level of the recursion until reaching an overall field value for a top-level triangle of the 2D triangular map; and
  storing the sampled and calculated field values of fewer than all of the nodes; and
 specifying the field over the 3D triangular mesh, wherein the specifying comprises:
  reading the stored field values; and
  estimating the field values of ones of the nodes that were not previously stored.

2. The method of claim 1, wherein the creating further comprises pruning nodes whose children nodes' field values are less than a specified level of variance.

3. The method of claim 2, wherein said storing includes storing the field values of unpruned nodes by level of recursion, wherein said storing includes storing the values of fewer than all of the sampled, unpruned leaf nodes.

4. The method of claim 3, further comprising:
 receiving a request to specify the field to a next lower level resolution than the depth level;
 reading the field values of the depth level sub-triangles that were not previously stored;
 repeating the generating, sampling, calculating, pruning, storing, and specifying for the next lower level resolution.

5. The method of claim 1, wherein the pruning includes removing one or more nodes.

6. The method of claim 1, wherein the calculated field values are average field values.

7. The method of claim 1, wherein the field includes at least one of pre-computed lighting, pre-computed shadows, or composited real-world photographs.

8. The method of claim 1, wherein the generating includes joining each vertex of a triangle of the 2D triangular map to a midpoint of the opposite side of the triangle.

9. The method of claim 1, further comprising:
 recalculating the field values at a resolution level, wherein the recalculation is performed at a plurality of vertices of the sub-triangles at the resolution level, wherein said recalculating includes re-averaging the values of the field over each sub-triangle adjacent to each vertex; and
 storing the recalculated field values at the plurality of vertices.

10. A non-transitory computer-readable storage medium storing program instructions, wherein the program instructions are computer-executable to implement:
 receiving a three-dimensional (3D) triangular mesh comprising a plurality of triangles;
 creating a two-dimensional (2D) triangular map for each triangle of the plurality of triangles, wherein the creating comprises:
  generating a plurality of sub-triangles within each triangle;

recursively repeating the generating for each sub-triangle until reaching a depth level, wherein the depth level depends on at least one of a target resolution or an entropy threshold;
sampling a field at a respective point within each of a plurality of leaf nodes, wherein each leaf node of the plurality of leaf nodes represents one of the sub-triangles at the depth level;
calculating a field value for a plurality of non-leaf nodes at each level of the recursion until reaching an overall field value for a top-level triangle of the 2D triangular map; and
storing the sampled and calculated field values of fewer than all of the nodes; and
specifying the field over the 3D triangular mesh, wherein the specifying comprises:
reading the stored field values; and
estimating the field values of ones of the nodes that were not previously stored.

11. The non-transitory computer-readable storage medium of claim 10 storing program instructions, wherein the program instructions are further computer-executable to implement pruning nodes whose children nodes' field values are less than a specified level of variance.

12. The non-transitory computer-readable storage medium of claim 11 storing program instructions, wherein said storing includes storing the field values of unpruned nodes by level of recursion, wherein said storing includes storing the values of fewer than all of the sampled, unpruned leaf nodes.

13. The non-transitory computer-readable storage medium of claim 12 storing program instructions, wherein the specifying further comprises:
computing re-sampled values of the field based on the read stored field values and estimated field values; and
supplying the re-sampled values to the render pipeline.

14. The non-transitory computer-readable storage medium of claim 12 storing program instructions, wherein the program instructions are further computer-executable to implement:
receiving a request to specify the field to a next lower level resolution than the depth level;
reading the field values of the depth level sub-triangles that were not previously stored;
repeating the generating, sampling, calculating, pruning, storing, and specifying for the next lower level resolution.

15. The non-transitory computer-readable storage medium of claim 10 wherein the calculated field values are average field values.

16. The non-transitory computer-readable storage medium of claim 10 wherein the generating includes joining each vertex of a triangle of the 2D triangular map to a midpoint of the opposite side of the triangle.

17. The non-transitory computer-readable storage medium of claim 10 storing program instructions, wherein the program instructions are further computer-executable to implement:
recalculating the field values at a resolution level, wherein the recalculation is performed at a plurality of vertices of the sub-triangles at the resolution level, wherein said recalculating includes re-averaging the values of the field over each sub-triangle adjacent to each vertex; and
storing the recalculated field values at the plurality of vertices.

18. A system, comprising:
at least one processor; and
a memory comprising program instructions, wherein the program instructions are executable by the at least one processor to:
receive a 3-dimensional (3D) triangular mesh comprising a plurality of triangles;
create a 2-dimensional (2D) triangular map for each triangle of the plurality of triangles, wherein the creating comprises:
generate four sub-triangles within each triangle;
recursively repeat the generating for each sub-triangle until reaching a depth level, wherein the depth level depends on at least one of a target resolution or an entropy;
sample a field at a respective point within each of a plurality of leaf nodes, wherein each leaf node of the plurality of leaf nodes represents one of the sub-triangles at the depth level;
calculate an average field value for a plurality of non-leaf nodes at each level of the recursion until reaching an overall average field value for a top-level triangle of the 2D triangular map;
prune nodes whose children nodes' average field values are less than a specified level of variance; and
store the average field values of unpruned nodes by level of recursion, wherein storing the average field values of the depth level sub-triangles includes storing the values of fewer than all of the sampled, unpruned leaf nodes and
specify the field over the 3D triangular mesh, wherein the specifying comprises:
reading the stored average field values; and
estimating the average field values of ones of the unpruned nodes that were not previously stored.

19. The system of claim 18, wherein the program instructions are further executable by the at least one processor to:
receive a request to specify the field to a next lower level resolution than the depth level;
read the average field values of the depth level sub-triangles that were not previously stored;
repeat the generating, sampling, calculating, pruning, storing, and specifying for the next lower level resolution.

20. The system of claim 18, wherein the program instructions are further executable by the at least one processor to:
compute re-sampled values of the field based on the read stored average field values and estimated average field values; and
supply the re-sampled values to a render pipeline.

21. The system of claim 18, wherein the program instructions are further executable by the at least one processor to:
recalculate the average field values at a resolution level, wherein the recalculation is performed at a plurality of vertices of the sub-triangles at the resolution level, wherein said recalculating includes re-averaging the values of the field over each sub-triangle adjacent to each vertex; and
store the recalculated average field values at the plurality of vertices.

22. The system of claim 18, wherein the field includes at least one of pre-computed lighting, pre-computed shadows, or composited real-world photographs.

23. A non-transitory computer-readable storage medium storing program instructions, wherein the program instructions are computer-executable to implement:
receiving a plurality of hierarchical, recursively subdivided 2-dimensional (2D) triangular maps, wherein each 2D triangular map includes stored:

an average value of a field for each level of the recursion and field values for fewer than all of a plurality of triangles at the lowest level of the recursion, wherein the average field values are stored by level of recursion;

reading the stored average field values and the stored field values for the lowest level triangles;

estimating a field value corresponding to each unstored triangle field value;

computing re-sampled values of the field based on the read stored average field values, read stored field values, and estimated field values; and supplying the re-sampled values for rendering.

* * * * *